United States Patent
Shimasaki et al.

(10) Patent No.: US 8,744,677 B2
(45) Date of Patent: Jun. 3, 2014

(54) REGENERATIVE CONTROL SYSTEM FOR A VEHICLE

(75) Inventors: Yuichi Shimasaki, Mishima (JP);
Yoshinori Futonagane, Susono (JP);
Takuya Hirai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 4 days.

(21) Appl. No.: 13/636,948

(22) PCT Filed: Mar. 25, 2010

(86) PCT No.: PCT/JP2010/055210
§ 371 (c)(1),
(2), (4) Date: Sep. 24, 2012

(87) PCT Pub. No.: WO2011/117994
PCT Pub. Date: Sep. 29, 2011

(65) Prior Publication Data
US 2013/0018548 A1    Jan. 17, 2013

(51) Int. Cl.
*G05B 11/32*    (2006.01)

(52) U.S. Cl.
USPC ............................................. 701/36; 303/152

(58) Field of Classification Search
None
See application file for complete search history.

(56) References Cited

U.S. PATENT DOCUMENTS

| | | | |
|---|---|---|---|
| 5,708,352 A * | 1/1998 | Umeda et al. | 322/28 |
| 6,543,565 B1 * | 4/2003 | Phillips et al. | 180/165 |
| 7,423,351 B2 * | 9/2008 | Maehara | 290/40 C |
| 7,528,585 B2 * | 5/2009 | Maehara | 322/59 |
| 7,912,622 B2 | 3/2011 | Yamaguchi | |
| 8,400,117 B2 * | 3/2013 | Fourmy et al. | 322/23 |
| 8,493,038 B2 * | 7/2013 | Kikuchi et al. | 322/59 |
| 8,569,902 B2 * | 10/2013 | Gibson et al. | 290/36 R |
| 2004/0162187 A1 * | 8/2004 | Suzuki | 477/182 |
| 2006/0238143 A1 * | 10/2006 | Uematsu et al. | 315/307 |
| 2007/0247119 A1 * | 10/2007 | Maehara | 322/28 |
| 2009/0079190 A1 * | 3/2009 | Saito et al. | 290/7 |

(Continued)

FOREIGN PATENT DOCUMENTS

| | | |
|---|---|---|
| JP | A-6-319206 | 11/1994 |
| JP | A-10-336804 | 12/1998 |

(Continued)

OTHER PUBLICATIONS

Hogan, Matthew, EIC STIC search for Application 13636948, Feb. 13, 2014.*

(Continued)

*Primary Examiner* — Fadey Jabr
*Assistant Examiner* — Krishnan Ramesh
(74) *Attorney, Agent, or Firm* — Oliff PLC

(57) ABSTRACT

The present invention is intended to suppress a change in a braking force due to a change in the magnitude of friction of an internal combustion engine, in a regenerative control system for a vehicle in which kinetic energy of wheels is made to be converted (regenerated) to electrical energy, at the time of deceleration running of the vehicle with the internal combustion engine mounted thereon. In order to solve this subject, the present invention is constructed such that the change in friction of the internal combustion engine is offset by adjustment of a regenerative braking force by regulating an amount of excitation current supplied to an electric generator according to the magnitude of friction in the internal combustion engine, at the time of deceleration running of the vehicle.

2 Claims, 9 Drawing Sheets

(56) References Cited

U.S. PATENT DOCUMENTS

| | | | |
|---|---|---|---|
| 2009/0085352 A1* | 4/2009 | Saito et al. | 290/7 |
| 2009/0195223 A1* | 8/2009 | Maehara | 322/24 |
| 2009/0248282 A1* | 10/2009 | Adachi | 701/112 |
| 2010/0057326 A1* | 3/2010 | Yamaguchi | 701/103 |
| 2011/0043171 A1* | 2/2011 | Niwa | 322/59 |
| 2011/0109278 A1* | 5/2011 | Kikuchi et al. | 322/59 |
| 2011/0175580 A1* | 7/2011 | Asada et al. | 322/45 |
| 2012/0104768 A1* | 5/2012 | Gibson et al. | 290/36 R |

FOREIGN PATENT DOCUMENTS

| | | |
|---|---|---|
| JP | A-2000-337493 | 12/2000 |
| JP | A-2001-83046 | 3/2001 |
| JP | A-2004-84514 | 3/2004 |
| JP | A-2004-268901 | 9/2004 |
| JP | A-2006-94624 | 4/2006 |
| JP | A-2007-186045 | 7/2007 |
| JP | A-2007-198170 | 8/2007 |
| JP | A-2007-211684 | 8/2007 |
| JP | A-2008-189122 | 8/2008 |
| JP | A-2009-138671 | 6/2009 |

OTHER PUBLICATIONS

International Search Report issued in International Patent Application No. PCT/JP2010/055210 dated Apr. 27, 2010.

* cited by examiner

REGENERATIVE CONTROL SYSTEM FOR A VEHICLE

TECHNICAL FIELD

The present invention relates to a technology of converting kinetic energy of wheels into electrical energy, by actuating an electric generator utilizing the kinetic energy of wheels, at the time of deceleration running of a vehicle.

BACKGROUND ART

In a Patent Document 1, there is described a technology in which in a system where an electric generator is caused to actuate utilizing kinetic energy of wheels at the time of deceleration running of a vehicle, a pumping loss of an internal combustion engine is changed according to a change in an amount of electric power generated by the electric generator (an amount of regeneration).

In a Patent Document 2, there is described a technology in which in a system where a fuel injection amount learning value is obtained on the basis of an idle injection amount reference value, so that an engine rotational speed can be controlled to a target idle engine rotational speed, the fuel injection amount learning value is obtained after correcting the idle injection amount reference value according to operating states of accessories (auxiliary machines) or a temperature of cooling water.

In a Patent Document 3, there is described a technology in which in a system where a fall in temperature of a catalyst is suppressed by decreasing an amount of intake air sucked into an internal combustion engine at the time of deceleration running of a vehicle, a pumping loss of the internal combustion engine is made to be reduced by regulating opening and closing timing of intake valves, so that an amount of regeneration of kinetic energy is made to increase.

In a Patent Document 4, there is described a technology in which the timing at that a voltage generated by an electric generator is changed to a low generated voltage from a standard generated voltage is made to be synchronized with the timing at that fuel injection is caused to resume from a fuel cut off state, so that a rotational variation of an internal combustion engine associated with a change of generated voltage is made to be reduced.

PRIOR ART REFERENCES

Patent Documents

Patent Document 1: Japanese patent application laid-open No. 2004-084514
Patent Document 2: Japanese patent application laid-open No. 2007-198170
Patent Document 3: Japanese patent application laid-open No. 2009-138671
Patent Document 4: Japanese patent application laid-open No.

SUMMARY OF THE INVENTION

Problems to be Solved by the Invention

However, when a vehicle with an internal combustion engine mounted thereon is in a deceleration running state, a braking force (engine brake) due to pumping work of the internal combustion engine is generated. The magnitude of engine brake changes with not only the magnitude (amount) of a pumping loss of the internal combustion engine, but also the magnitude of friction. For that reason, if the magnitude of friction in the internal combustion engine changes, the magnitude of a total braking force acting on the vehicle (a braking force which is obtained by adding the engine brake to a regenerative braking force) will change.

The present invention has been made in view of the above-mentioned actual circumstances, and the object of the present invention is to suppress a change in a total braking force due to a change in the magnitude of friction in an internal combustion engine, in a system in which kinetic energy of wheels is made to be converted (regenerated) into electrical energy, by actuating an electric generator utilizing the kinetic energy of wheels at the time of deceleration running of a vehicle with the internal combustion engine mounted thereon.

Means for Solving the Problems

In order to solve the above-mentioned problems, the present invention is constructed such that in a regenerative control system for a vehicle which serves to convert (regenerate) kinetic energy of wheels into electrical energy at the time of deceleration running of the vehicle, an amount of electric power (an amount of regeneration) generated by an electric generator is regulated according to the magnitude of friction in an internal combustion engine.

Specifically, the present invention resides in a regenerative control system for a vehicle which serves to convert kinetic energy of wheels into electrical energy by applying an excitation current to an electric generator at the time of deceleration running of the vehicle on which an internal combustion engine and the electric generator being able to be operatively connected with wheels are mounted, wherein the excitation current is regulated according to the magnitude of friction in the internal combustion engine.

When control for converting (regenerating) the kinetic energy of wheels into electrical energy (hereinafter referred to as "regenerative control") at the time of deceleration running of the vehicle is carried out, a regenerative braking force acts on the vehicle. Moreover, the kinetic energy of wheels is consumed by pumping work (pumping loss) of the internal combustion engine, and hence, engine brake acts on the vehicle.

In addition to the magnitude of the pumping loss of the internal combustion engine, the magnitude (amount) of the engine brake changes also with the magnitude (amount) of friction in the internal combustion engine (hereinafter referred to as "engine friction"). For example, when the engine friction is large, the engine brake becomes larger in comparison with the time when the engine friction is small. For that reason, in cases where the magnitude of the regenerative braking force (the amount of electric power generated by the electric generator) is decided in consideration of only the magnitude of the pumping loss of the internal combustion engine, the magnitude of a total braking force (a braking force which is obtained by adding the engine brake to the regenerative braking force) may change according to the magnitude of the engine friction.

On the other hand, in the regenerative control system for a vehicle according to the present invention, the amount of excitation current for the electric generator is regulated depending on the magnitude of the engine friction. That is, the regenerative braking force is regulated according to the magnitude of friction in the internal combustion engine. For example, when the engine friction is large, the amount of excitation current is made smaller in comparison with the time when the engine friction is small. As a result, in cases where the engine friction is large, the regenerative braking force becomes smaller in comparison with the case where the engine friction is small. In addition, when the engine friction is small, the amount of excitation current is made larger in comparison with the time when the engine friction is large. As a result, in cases where the engine friction is small, the regenerative braking force becomes larger in comparison with the case where the engine friction is large.

When the regenerative braking force is regulated according to the magnitude of the engine friction in this manner, it is possible to avoid a situation where the total braking force is changed due to a change in the magnitude of the engine friction. For example, it is possible to avoid a situation where the total braking force becomes too large or excessive when the engine friction is large, and a situation where the total braking force becomes too small or insufficient when the engine friction is small, etc. Stated in another way, the magnitude of the total braking force can be converged to a desired magnitude irrespective of the magnitude of the engine friction.

The magnitude of the engine friction is mainly correlated with a drive loss of the oil pump and a sliding resistance in slide parts of the internal combustion engine resulting from the viscosity of lubricating oil. The viscosity of lubricating oil changes according to the temperature of the lubricating oil. The drive loss of the oil pump changes according to the viscosity of the lubricating oil and an amount of lubricating oil delivered per unit time by the oil pump. The amount of lubricating oil delivered per unit time by the oil pump is correlated with the engine rotational speed. The sliding resistance of the slide parts (e.g., bearing portions of a crank journal, etc.) of the internal combustion engine changes according to the viscosity of the lubricating oil and the engine rotational speed.

Accordingly, the regenerative control system for a vehicle according to the present invention may be equipped with an arithmetic operation model (calculation model) which serves to calculate the magnitude of the engine friction by using, as arguments, the temperature of the lubricating oil and the engine rotational speed at the time of the execution of the regenerative control. By using such an arithmetic operation model, it is possible to obtain the magnitude of friction on which the magnitude of the drive loss of the oil pump and the magnitude of the sliding resistance in the slide parts of the internal combustion engine resulting from the viscosity of the lubricating oil are reflected. Here, note that because the magnitude of the pumping loss of the internal combustion engine is correlated with the engine rotational speed, the above-mentioned arithmetic operation model may also be made as an arithmetic operation model which serves to calculate a total sum of the engine friction and the pumping loss.

In addition, in cases where the lubricating oil has degraded with the lapse of time, or in cases where the kind of the lubricating oil is changed by a user of the vehicle, etc., the magnitude of friction calculated according to the arithmetic operation model and the actual magnitude of friction may differ from each other.

Accordingly, the regenerative control system for a vehicle according to the present invention may obtain the actual magnitude of friction in the internal combustion engine from an amount of fuel injection when the internal combustion engine is in a no-load running state, and at the same time, calculate the magnitude of the engine friction by making use of the arithmetic operation model. Then, correction of the arithmetic operation model may be carried out according to a difference of these two values. The correction referred to herein includes a mode to correct a value which have been calculated according to the arithmetic operation model, a mode to correct a coefficient(s) included in the arithmetic operation model, and a mode to carry out addition, subtraction, multiplication and division of the arithmetic operation model by a correction coefficient.

The amount of fuel injection at the time of no-load running is correlated with the magnitude of the engine friction. For example, in cases where the engine friction is large, the amount of fuel injection becomes larger in comparison with the case where the engine friction is small. Therefore, when the magnitude of friction changes due to the degradation of the lubricating oil or the change of the kind of the lubricating oil, the amount of fuel injection at the time of no-load running will change from an initial value thereof (e.g., an amount of fuel injection when the lubricating oil of the kind assumed at the time of the designing of the internal combustion engine is used and when the temperature of the lubricating oil is an appropriate temperature).

The change of friction accompanying the degradation over time of the lubricating oil or a change of the kind thereof can be obtained by making a comparison between the magnitude of friction obtained based on the amount of fuel injection at the time of the no-load running of the internal combustion engine, and the magnitude of friction obtained according to the arithmetic operation model under the same operating state of the internal combustion engine. In other words, a difference between the both of them can be assumed as a width of change of friction accompanying the degradation over time of the lubricating oil, or the change of the kind thereof. Accordingly, if the arithmetic operation model is corrected by the use of the difference between the both of them, it becomes possible to obtain the magnitude of the engine friction with high accuracy, even in cases where the lubricating oil has degraded with the lapse of time, or in cases where the kind of the lubricating oil has been changed.

Moreover, on the vehicle which is in a deceleration running state, there act a running resistance of the vehicle and a braking force (hereinafter referred to as "frictional braking force") of a mechanical brake (a braking device which serves to convert the kinetic energy of the vehicle into thermal energy by the use of friction), in addition to the regenerative braking force and the engine brake. Therefore, the magnitude of the regenerative braking force may be decided in consideration of the magnitude of the running resistance and the magnitude of the frictional braking force, in addition to the magnitude of the engine brake.

For example, the amount of excitation current for the electric generator may be decided in such a manner that an energy (=Evhl−(Erl+Ebrk+Eegbk)), which is obtained by subtracting, from a kinetic energy Evhl of the vehicle, a deceleration energy Erl due to the running resistance, a deceleration energy Ebrk due to the frictional braking force, and a deceleration energy Eegbk due to the engine brake, is converted into an electrical energy. If the amount of excitation current (the amount of power generation) of the electric generator is decided in this manner, in cases where the magnitude of the engine friction has changed, or in cases where the magnitude of the running resistance changes, etc., such a change can be offset by increasing or decreasing the regenerative braking force. As a result, the relation between the amount of operation of the mechanical brake and the magnitude of the frictional braking force can be kept in a fixed relationship.

Effect of the Invention

According to the present invention, in a regenerative control system for a vehicle in which kinetic energy of wheels is regenerated to electrical energy at the time of deceleration running of the vehicle, it is possible to suppress a change in a total braking force due to a change in the magnitude of friction of an internal combustion engine.

MODES FOR CARRYING OUT THE INVENTION

Hereinafter, specific embodiments according to the present invention will be described based on the attached drawings. However, the dimensions, materials, shapes, relative arrangements and so on of component parts described in the embodiments are not intended to limit the technical scope of the present invention to these alone in particular as long as there are no specific statements.

<First Embodiment>

Figure 1:
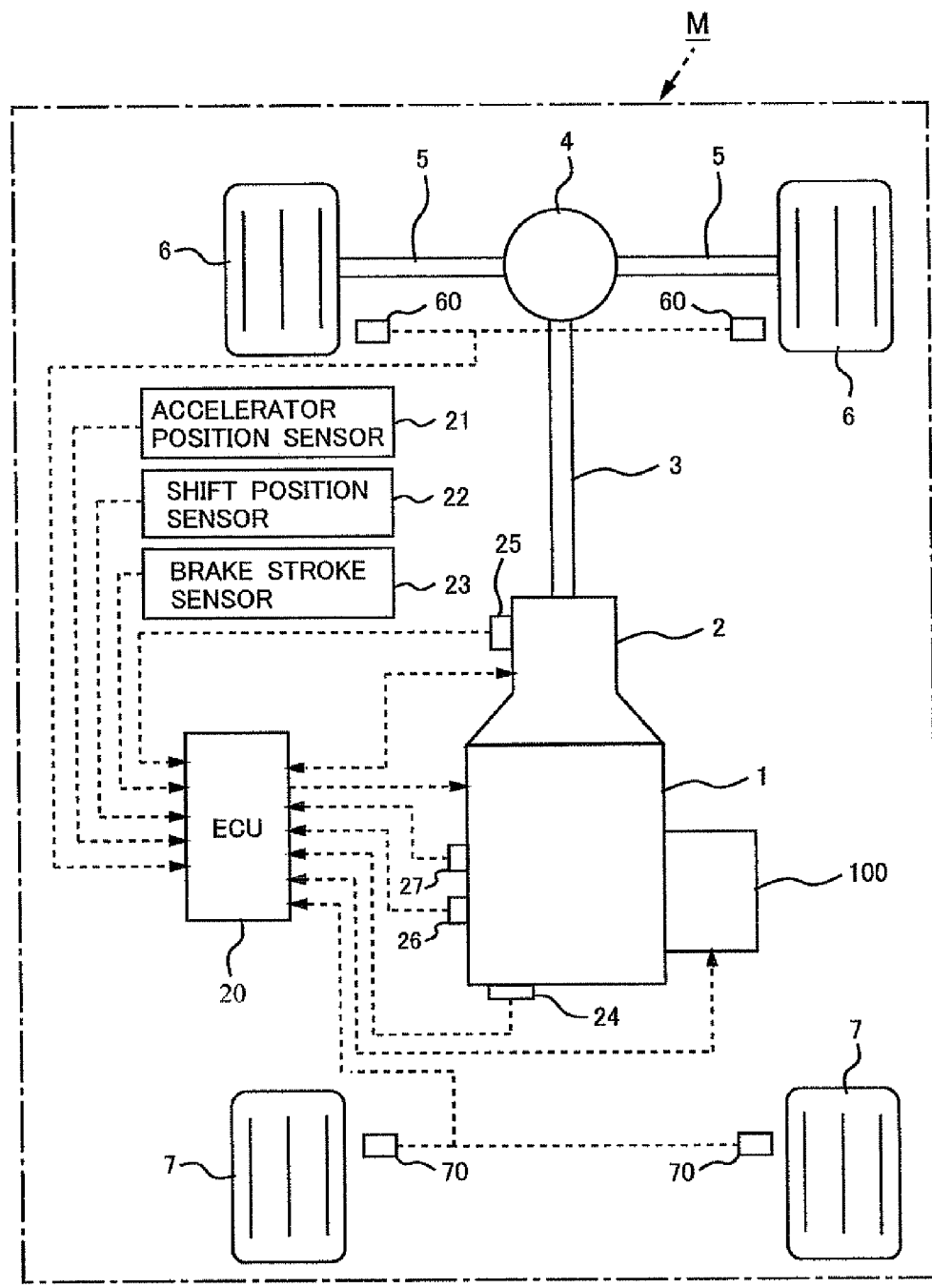
FIG. 1 is a view showing the schematic construction of a vehicle to which the present invention is applied.

First, reference will be made to a first embodiment according to the present invention based on FIGS. 1 through 8. FIG. 1 is a view showing the schematic construction of a vehicle to which the present invention is applied. The vehicle M shown in FIG. 1 is an automobile or a motor vehicle which is equipped with two pairs of wheels 6, 7.

An internal combustion engine 1 as a prime mover is mounted on the vehicle M. An output shaft of the internal combustion engine 1 is connected with an input shaft of a transmission 2. An output shaft of the transmission 2 is connected with a differential gear 4 through a propeller shaft 3. Two drive shafts 5 are connected with the differential gear 4. The drive shafts 5 are connected with one pair of wheels 6, respectively. Here, note that remaining wheels 7 are hung or suspended by the vehicle M in such a manner as to be freely rotatable in a circumferential direction (hereinafter, the wheels 6 are referred to as "the drive wheels 6", and the wheels 7 are referred to as the idle or driven wheels 7").

The power outputted from the internal combustion engine 1 (rotating or running torque of the output shaft thereof), after being changed in speed by the transmission 2, is transmitted to the propeller shaft 3, and it is then transmitted to the drive shafts 5 and the drive wheels 6 after being reduced in speed or slowed down by the differential gear 4.

Figure 2:
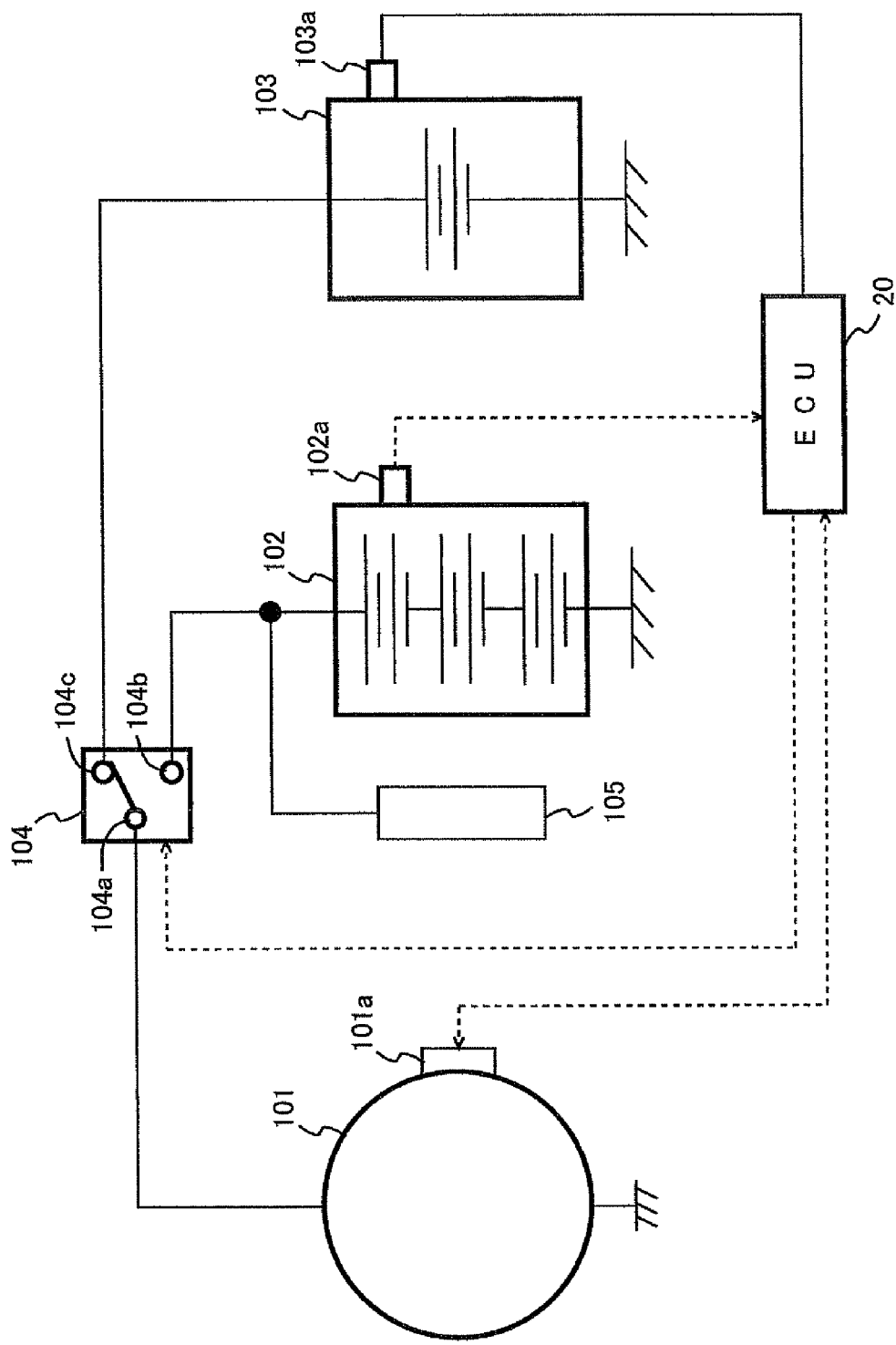
FIG. 2 is a view showing the schematic construction of a power generation mechanism.

A power generation mechanism 100 is arranged in combination or parallel with the internal combustion engine 1. The power generation mechanism 100 is provided with an alternator 101, a high voltage battery 102, a low voltage battery 103, a changeover switch 104, and a high voltage electric load 105, as shown in FIG. 2.

The alternator 101 is an electric generator which is connected with the output shaft of the internal combustion engine 1 (or a member which rotates in association with the output shaft) through pulleys and a belt, etc., so that it converts the kinetic energy (rotational energy) of the output shaft into electrical energy.

Specifically, the alternator 101 is a three-phase AC generator which is equipped with a stator coil having a three-phase winding, a field coil wound around a rotor, a rectifier that rectifies an alternating current generated in the stator coil into a direct current, and a regulator 101a that changes over between turn-on and turn-off of an excitation current (field current) to the field coil.

When the field current is supplied to the field coil, the alternator 101 constructed in this manner generates an induction current (three-phase AC current) in the stator coil, rectifies the three-phase AC current thus generated into a DC current, and outputs it.

The construction is such that the output of the alternator 101 is inputted to an input terminal 104a of the changeover switch 104. The changeover switch 104 is equipped with one input terminal 104a and two output terminals 104b, 104c, and is a circuit which serves to change over the connection destination of the input terminal 104a to either one of the two output terminals 104b, 104c.

One (hereinafter referred to as a "first output terminal") 104b of the two output terminals 104b, 104c of the changeover switch 104 is connected to the high voltage battery 102 and the high voltage electric load 105. The other (hereinafter referred to as a "second output terminal") 104c of the two output terminals 104b, 104c is connected to the low voltage battery 103.

The high voltage battery 102 is a battery into and from which electricity of a high voltage (e.g., about 42 V) can be charged and discharged, and is composed of a lead storage battery, a nickel hydrogen battery, or a lithium ion battery. The high voltage electric load 105 is an electric load which is operated by means of electrical energy of high voltage. As such an electric load, there are mentioned, for example, a defogger, an oil heater, an electric water pump, and a motor assist turbo, an electrically heated catalyst, a starter motor, and so on. The low voltage battery 103 is a battery into and from which electricity of a voltage (e.g., about 14 V) lower than that of the high voltage battery 102 can be charged and discharged, and is composed of a lead storage battery, a nickel hydrogen battery, or a lithium ion battery.

Here, reverting to FIG. 1, on the vehicle, there is mounted an electronic control unit (ECU) 20 for controlling the internal combustion engine 1, the transmission 2 and the power generation mechanism 100 in an electrical manner, in combination therewith. Here, note that in FIG. 1, the single ECU 20 is used, but it may be divided into three parts, i.e., an ECU for the internal combustion engine 1, an ECU for the transmission 2, and an ECU for the power generation mechanism 100, respectively.

To the ECU 20, there are inputted the output signals of a variety of kinds of sensors such as an accelerator position sensor 21, a shift position sensor 22, a brake stroke sensor 23, a crank position sensor 24, a vehicle speed sensor 25, an oil temperature sensor 26, an oil pressure sensor 27, a first SOC sensor 102a, a second SOC sensor 103a, a pair of first wheel speed sensors 60, a pair of second wheel speed sensors 70, and so on.

The accelerator position sensor 21 is a sensor which outputs an electrical signal corresponding to the amount of operation (the amount of depression or step down) of an accelerator pedal. The shift position sensor 22 is a sensor which outputs an electrical signal corresponding to the position of operation of a shift lever. The brake stroke sensor 23 is a sensor which outputs an electrical signal corresponding to the amount of operation (the amount of depression or step down) of an operation pedal (brake pedal) for mechanical brake. The crank position sensor 24 is a sensor which outputs an electrical signal corresponding to the rotational position of the output shaft (crankshaft) of the internal combustion engine 1. The vehicle speed sensor 25 is a sensor which outputs an electrical signal corresponding to the travel speed of the vehicle (vehicle speed). The oil temperature sensor 26 is a sensor which outputs an electrical signal corresponding to the temperature of lubricating oil circulating through the internal combustion engine 1. The oil pressure sensor 27 is a sensor which outputs an electrical signal corresponding to the pressure of the lubricating oil circulating through the internal combustion engine 1. The first SOC sensor 102a is a sensor which outputs an electrical signal corresponding to the state of charge of the high voltage battery 102. The second SOC sensor 103a is a sensor which outputs an electrical signal corresponding to the state of charge of the low voltage battery 103. The first wheel speed sensors 60 are sensors which output electrical signals corresponding to rotational speeds (angular speed) of the drive wheels 6, respectively. The second wheel speed sensors 70 are sensors which output electrical signals corresponding to rotational speeds (angular speed) of the driven wheels 7, respectively.

The ECU 20 controls the operating state of the internal combustion engine 1, the speed change state of the transmission 2, the power generation state of the power generation mechanism 100, and so on based on output signals of above-mentioned various kinds of sensors. In the following, a method for controlling the power generation mechanism 100 by means of the ECU 20 will be described.

The ECU 20 changes a power generation voltage of the alternator 101 by performing the duty control of the on and off of the regulator 101a. Specifically, in cases where the power generation voltage of the alternator 101 is made higher, the ECU 20 decides a duty ratio in such a manner that the on time of the regulator 101a becomes long (i.e., the off time thereof becomes short). On the other hand, in cases where the power generation voltage of the alternator 101 is made lower, the ECU 20 decides the duty ratio in such a manner that the on time of the regulator 101a becomes short (i.e., the off time thereof becomes long). Moreover, the ECU 20 also senses an actual power generation voltage of the alternator 101, and carries out feedback control of the duty ratio according to the difference between the actual power generation voltage and a target power generation voltage thereof.

When the high voltage battery 102 is charged, or when electricity is supplied to the high voltage electric load 105, the ECU 20 carries out the duty control of the regulator 101a so as to make the power generation voltage of the alternator 101 in match with a voltage (hereinafter, referred to as a "high voltage") which is suitable for charging the high voltage battery 102, and at the same time, controls the changeover switch 104 in such a manner that the input terminal 104a and the first output terminal 104b are connected with each other.

On the other hand, when the low voltage battery 103 is charged, the ECU 20 carries out the duty control of the regulator 101a so as to make the power generation voltage of the alternator 101 in match with a voltage (hereinafter, referred to as a "low voltage") which is suitable for charging the low voltage battery 103, and at the same time, controls the changeover switch 104 in such a manner that the input terminal 104a and the second output terminal 104c are connected with each other.

In addition, when the vehicle M is in a deceleration running state, for example, when the vehicle speed is larger than zero and the amount of operation of the accelerator pedal is zero, the kinetic energy of the drive wheels 6 is transmitted to the alternator 101 through the drive shafts 5, the differential gear 4, the propeller shaft 3, the transmission 2, and the internal combustion engine 1. In other words, the rotor of the alternator 101 is driven to rotate in association with the drive wheels 6. In that case, if the field current is applied to the alternator 101, the kinetic energy of the drive wheels 6 can be converted (regenerated) into electrical energy.

Accordingly, by applying the field current to the alternator 101 when the vehicle M is in a deceleration running state, the ECU 20 carries out regenerative control to convert (regenerate) the kinetic energy of the drive wheels 6 to electrical energy.

It is desirable that at the time of deceleration running of the vehicle M, the relation between the deceleration of the vehicle M and driving conditions (e.g., the vehicle speed, the shift position, the amount of operation of the brake pedal, etc.) be fixed as much as possible. For that reason, it is desirable that the magnitude of the sum (total braking force) of a regenerative braking force and an engine brake force be fixed with respect to the driving conditions of the vehicle M.

However, the magnitude of the engine brake force changes with not only the magnitude of the pumping loss of the internal combustion engine, but also the magnitude of friction thereof. For that reason, as the magnitude of friction of the internal combustion engine 1 (engine friction) changes, the magnitude of the total braking force and the deceleration of the vehicle M also change. As a result, it is desirable that the magnitude of the regenerative braking force (the amount of power generation of the alternator 101 (the amount of regeneration)) be decided by taking account of the magnitude of the engine friction.

The magnitude of the engine friction is correlated with the viscosity of the lubricating oil. That is, as the viscosity of the lubricating oil changes, the magnitude of a drive loss of the oil pump, the magnitude of the sliding resistance of slide parts, and the like change. For example, the drive loss of the oil pump becomes larger, and at the same time the sliding resistance of the slide parts becomes larger in cases where the viscosity of the lubricating oil is high, in comparison with the case where it is low. As a result, the engine friction becomes larger in cases where the viscosity of the lubricating oil is low, in comparison with the case where it is high.

Accordingly, if the magnitude of the regenerative braking force (the amount of the field current applied to the alternator 101) is decided without regard for the magnitude of the engine friction, there may occur a situation where the magnitude of the total braking force changes with the magnitude of the engine friction. In such a case, the deceleration of the vehicle M will change with the magnitude of the engine friction, so that an odd or uncomfortable feeling may be give to the driver of the vehicle M.

Accordingly, in the regenerative control of this embodiment, the ECU 20 specifies the magnitude of the engine friction based on the magnitude of the drive loss of the oil pump and the magnitude of the sliding resistance of the slide parts resulting from the viscosity of the lubricating oil. Furthermore, the ECU 20 regulates the regenerative braking force (the amount of the field current applied to the alternator 101) in accordance with the magnitude of the engine friction thus specified.

Figure 3:
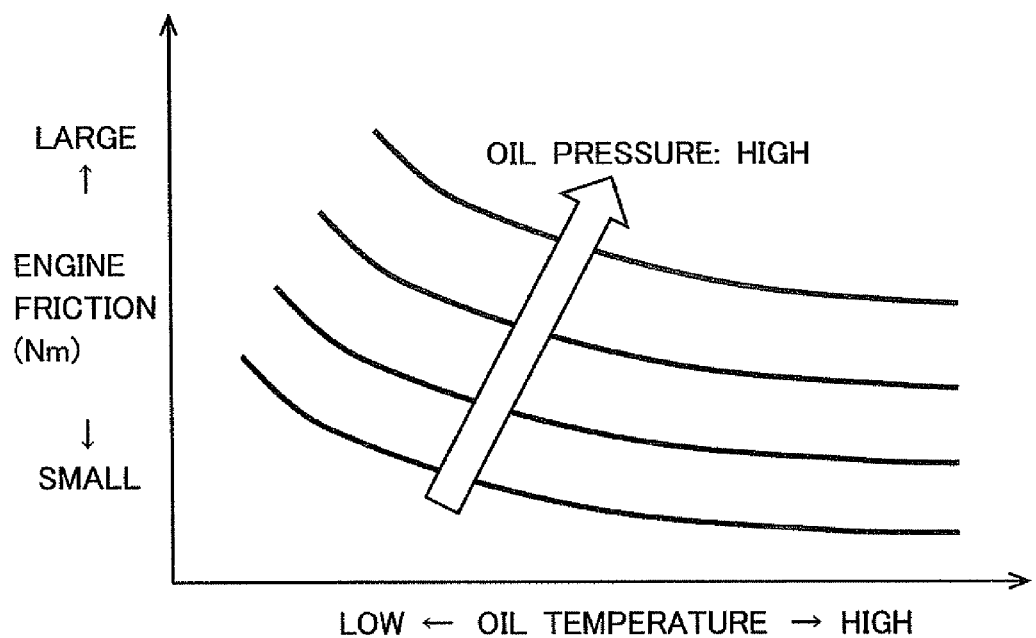
FIG. 3 is a view showing the relation among an oil temperature, an oil pressure and an engine load in a reference engine rotational speed.
Figure 4:
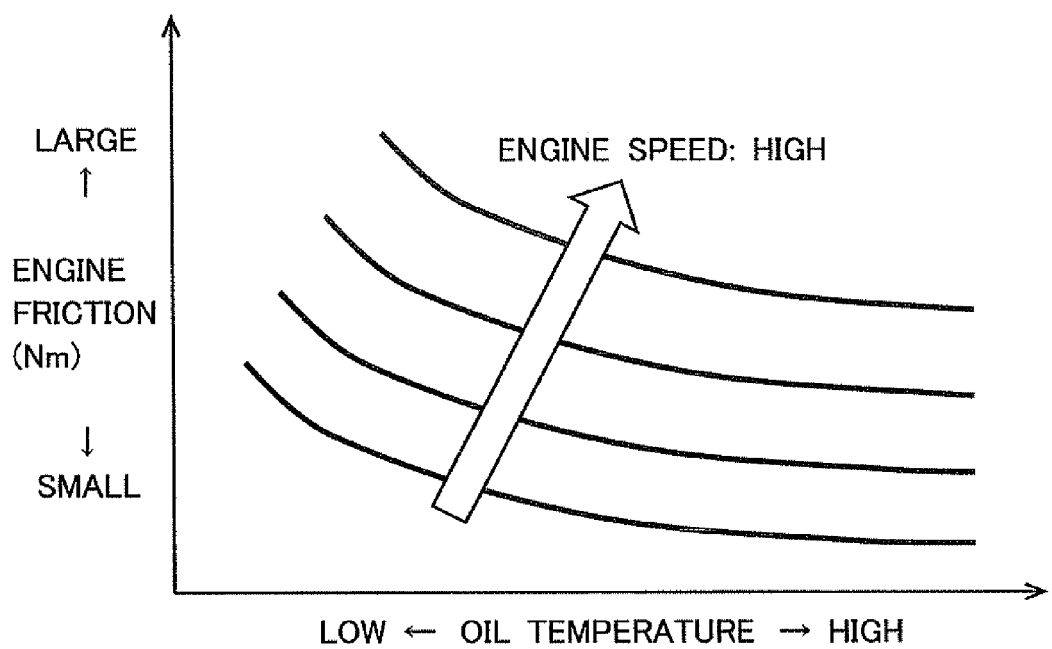
FIG. 4 is a view showing the relation among an oil temperature, a engine rotational speed and an engine load when the oil pressure is constant.
Figure 5:
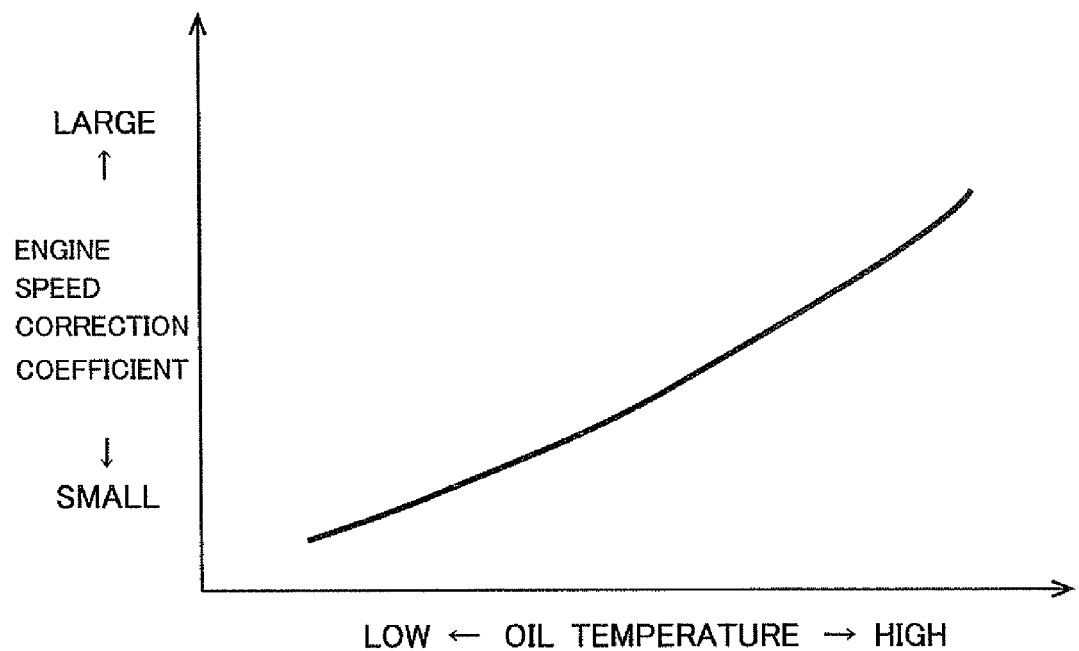
FIG. 5 is a view showing the relation between a engine rotational speed and a engine rotational speed correction coefficient.

Here, a method to specify the magnitude of the engine friction is explained based on FIGS. 3 through 5. Here, note that the engine friction referred to herein is assumed to also include the pumping work (pumping loss) of the internal combustion engine 1, in addition to the drive loss of the oil pump and the sliding resistance of the slide parts resulting from the viscosity of the lubricating oil.

The ECU 20 first calculates an engine friction (hereinafter, referred to as a "reference engine friction") in a prescribed engine rotational speed (hereinafter, referred to as a "reference engine rotational speed") by the use of an output signal Toil of the oil temperature sensor 26, and an output signal Poil of the oil pressure sensor 27 as arguments.

As shown in FIG. 3, under the condition that the engine rotational speed is constant, the engine friction tends to become larger when the oil temperature is low and the oil pressure is high, in comparison with the case when the oil temperature is high and the oil pressure is low. Accordingly, in this embodiment, the relations among the oil temperature and the oil pressure in the reference engine rotational speed, and the reference engine friction have been beforehand obtained experimentally, and these relations have been mapped.

The ECU 20 can calculate the reference engine friction by making use of a map shown in FIG. 3, while using an output signal Toil of the oil temperature sensor 26 and an output signal Poil of the oil pressure sensor 27 as arguments.

Here, note that there is a high possibility that the engine rotational speed (hereinafter referred to as an "actual engine rotational speed") at the time when the oil temperature Toil and the oil pressure Poil are measured may be different from the reference engine rotational speed. For that reason, in cases where the actual engine rotational speed is different from the reference engine rotational speed, it is necessary to obtain an engine friction which is suitable for the actual engine rotational speed.

FIG. 4 is the result of the measurement of the relation among the oil temperature, the engine rotational speed and the engine friction in cases where the oil pressure is fixed or constant. According to the measurement result of FIG. 4, even if the oil pressure and the oil temperature are constant, there is a tendency that the engine friction becomes larger when the engine rotational speed is high than when it is low. For this reason, in cases where the actual engine rotational speed is higher than the reference engine rotational speed, it is necessary to correct the reference engine friction so as to increase it. And, in cases where the actual engine rotational speed is lower than the reference engine rotational speed, it is necessary to correct the reference engine friction so as to decrease it.

Accordingly, the ECU 20 calculates an engine friction suitable for the actual engine rotational speed by correcting the reference engine friction with a correction coefficient (hereinafter referred to as a "engine rotational speed correction coefficient") based on the actual engine rotational speed.

FIG. 5 is a view showing the relation between the engine rotational speed correction coefficient and the engine rotational speed. The engine rotational speed correction coefficient shown in FIG. 5 is a value which is obtained by dividing the engine friction (the engine friction measured under a fixed engine rotational speed, similar to FIG. 3) in each engine rotational speed by the reference engine friction. The relation shown in FIG. 5 is assumed to have been made into a map beforehand by an adaptation process which makes use of experiments, etc.

The ECU 20 calculates the engine rotational speed correction coefficient by making use of the map shown in FIG. 5 with the use of the actual engine rotational speed as an argument. Subsequently, the ECU 20 calculates the engine friction suitable for the actual engine rotational speed by multiplying the above-mentioned reference engine friction by the engine rotational speed correction coefficient obtained from the map of FIG. 5.

Here, note that the engine friction can be obtained by making use of the maps of FIG. 3 through FIG. 5 as mentioned above, but an arithmetic operation (calculation) model may have been beforehand created based on the relations of FIG. 3 through FIG. 5, and the engine friction may be calculated according to the arithmetic operation model thus created. An arithmetic operation model in that case can be represented by the following expression, for example.

$$F = \alpha * \mathrm{EXP}(\beta * Ne) * (\gamma * Ov^2 + \delta * Ov + \epsilon)$$

In the above-mentioned expression, "F" represents the engine friction; "Ne" represents the engine rotational speed; and "Ov" represents the viscosity which is decided according to the temperature of the lubricating oil, respectively. In addition, "α" represents a coefficient which is decided according to the area of the slide parts of the internal combustion engine 1, etc.; "β" represents a coefficient which is decided according to the extent or degree of change of the engine friction with respect to a change in the engine rotational speed of the internal combustion engine 1; "γ" and "δ" represent coefficients which are decided according to the extents or degrees of change of the engine friction with respect to a change in the oil temperature Toil; and "ε" represents a constant which is decided according to the extent or degree of change of the engine friction with respect to a change in the oil pressure Poll, respectively.

When the engine friction is obtained according to the various methods as mentioned above, the ECU 20 calculates the magnitude of the regenerative braking force (a target amount of power generation of the alternator 101) in such a manner that the total braking force is coincident with a target value thereof.

A target value Etoltrg of the total braking force is a value (Etoltrg=Evhl−(Ed+Ebrk)) which is obtained by subtracting a speed reduction or a deceleration energy Erl due to a running resistance of the vehicle and a deceleration energy Ebrk due to a frictional braking force from a kinetic energy Evhl of the vehicle M.

The kinetic energy of the vehicle M can be calculated by the use of the weight and the vehicle speed (the output signal of the vehicle speed sensor 25) of the vehicle M as parameters.

The running resistance is a force which acts in a direction reverse or opposite to a direction of movement of the vehicle M. The running resistance includes air resistance of a vehicle body, rolling resistance of wheels 6, 7, grade resistance of a traveling road, a frictional drag or resistance in bearings of wheels 6, 7, and so on. The deceleration energy (hereinafter referred to simply as a "running resistance") Erl due to the running resistance can be calculated by using, as parameters, an air resistance coefficient of the vehicle body, a frontal projected area of the vehicle M, the vehicle speed (the output signal of the vehicle speed sensor 25), a rolling resistance coefficient of wheels 6, 7, the weight of the vehicle M, and the grade or slope of the traveling road.

The deceleration energy (hereinafter referred to simply as a "frictional braking force") Ebrk due to the frictional braking force can be calculated by using, as parameters, a coefficient of friction of a friction member (brake pad) used for a mechanical brake, rotational speeds of wheels 6, 7 (output signals of wheel speed sensors 60, 70), and the amount of operation of the brake pedal (the output signal of the brake stroke sensor 23).

Next, the ECU 20 calculates the target value Eregtrg (=Etoltrg−Eegbk) of the regenerative braking force by subtracting a deceleration energy (hereinafter referred to simply as an "engine brake") Eegbk due to engine braking from the target value Etoltrg of the total braking force. Here, note that the engine brake Eegbk is what is obtained by adding an engine friction F to a pumping loss Eegpl of the internal combustion engine 1 (i.e., Eegbk=Eegpl+F). The pumping loss Eegpl of the internal combustion engine 1 can be calculated by using, as a parameter, the engine rotational speed Ne or the degree of opening of a throttle valve.

When the target value Eregtrg (=Evhl−(Ed+Ebrk+Eegbk)) of the regenerative braking force is decided in this manner, it is possible to avoid a situation where the total braking force becomes too large or too small with a change in the engine friction F.

Figure 6:
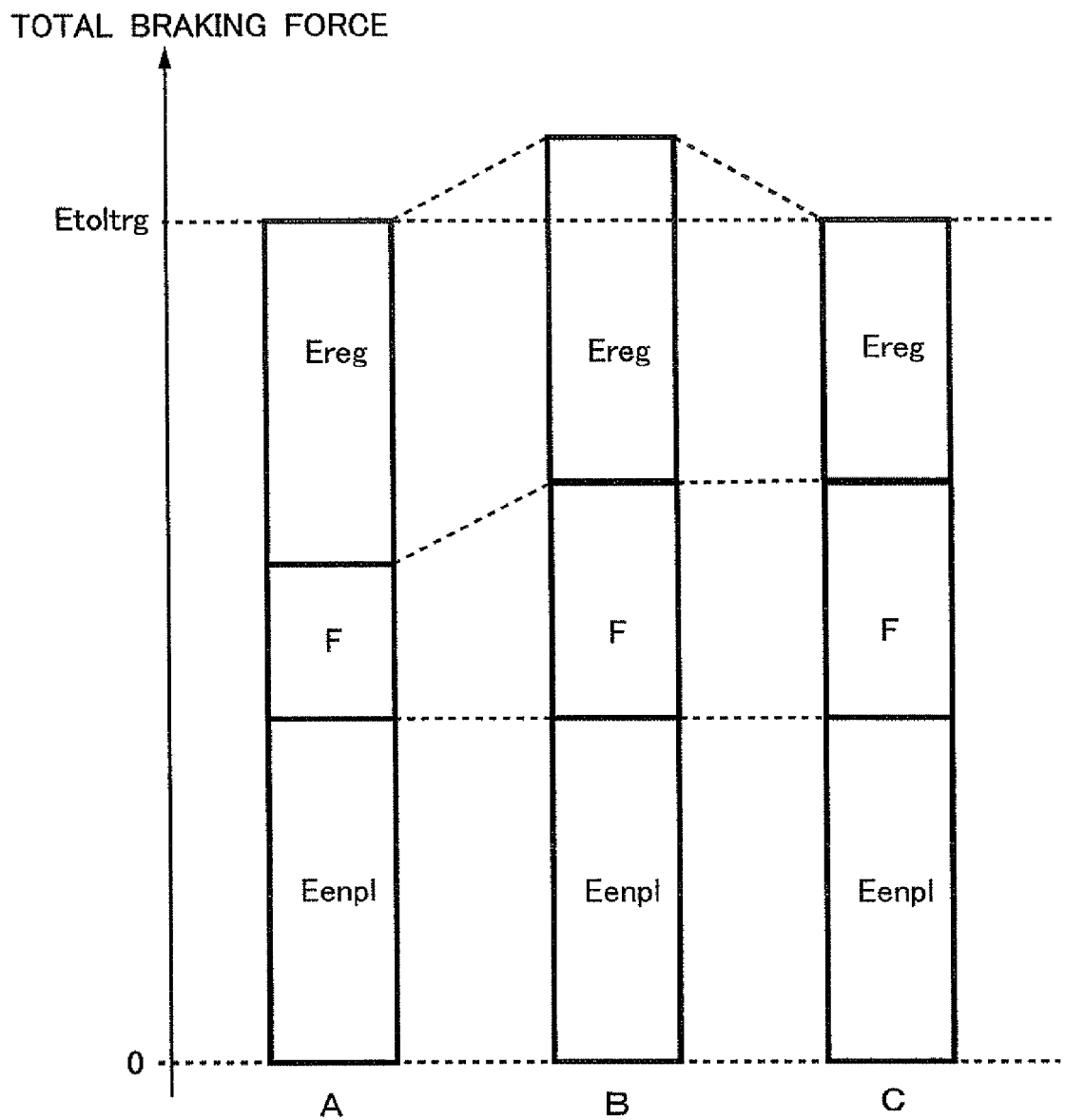
FIG. 6 is a view showing the relation between an engine friction and a total braking force in cases where the viscosity of lubricating oil becomes higher than a proper range.

FIG. 6 is a view showing the relation between the engine friction F and the total braking force in cases where the viscosity of the lubricating oil becomes higher than a proper range (e.g., the viscosity of the lubricating oil after the completion of warming up of the internal combustion engine 1). A in FIG. 6 indicates the total braking force at the time when the viscosity of the lubricating oil is in the proper range. B in FIG. 6 indicates the total braking force at the time when the viscosity of the lubricating oil is higher than the proper range and at the same time the adjustment of the regenerative braking force is not carried out. C in FIG. 6 indicates the total braking force at the time when the viscosity of the lubricating oil is higher than the proper range and at the same time the adjustment of the regenerative braking force is carried out.

As shown in B in FIG. 6, when the viscosity of the lubricating oil becomes higher than the proper range, the engine friction F increases. At that time, if the adjustment of the regenerative braking force Ereg is not carried out, the total braking force will exceed the target value Etoltrg. As a result, the deceleration of the vehicle M becomes too large or excessive with respect to the amount of operation of the brake pedal. When the deceleration of the vehicle M becomes excessive with respect to the amount of operation of the brake pedal, there occurs a need for the driver to decrease the amount of operation of the brake pedal.

On the other hand, as shown in C in FIG. 6, when the regenerative braking force Ereg is decreased according to the increased amount of the engine friction F, the total braking force becomes equivalent to the target value Etoltrg. In other words, the amount of increase of the engine friction F will be offset by the amount of decrease of the regenerative braking force Ereg. As a result, it is possible to avoid the situation where the deceleration of the vehicle M becomes excessive with respect to the amount of operation of the brake pedal.

Figure 7:
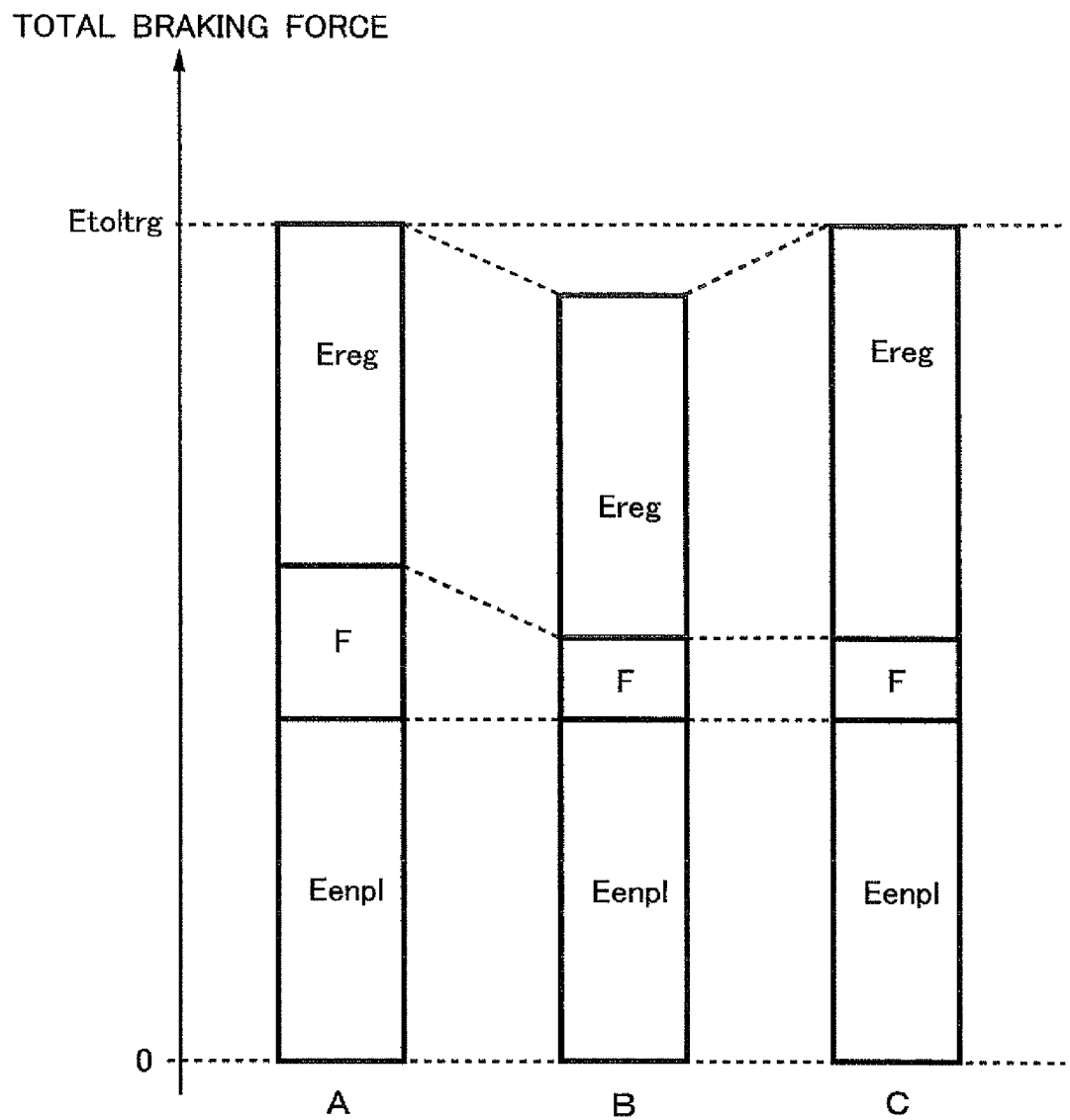
FIG. 7 is a view showing the relation between an engine friction and a total braking force in cases where the viscosity of lubricating oil becomes lower than the proper range.

FIG. 7 is a view showing the relation between the engine friction F and the total braking force in cases where the viscosity of lubricating oil becomes lower than the proper range. A in FIG. 7 indicates the total braking force at the time when the viscosity of the lubricating oil is in the proper range. B in FIG. 7 indicates the total braking force at the time when the viscosity of the lubricating oil is lower than the proper range and at the same time the adjustment of the regenerative braking force is not carried out. C in FIG. 7 indicates the total braking force at the time when the viscosity of the lubricating oil is lower than the proper range and at the same time the adjustment of the regenerative braking force is carried out.

As shown by B in FIG. 7, when the viscosity of the lubricating oil becomes lower than the proper range, the engine friction F decreases. At that time, if the adjustment of the regenerative braking force Ereg is not carried out, the total braking force will fall below the target value Etoltrg. As a result, the deceleration of the vehicle M becomes too small or insufficient with respect to the amount of operation of the brake pedal. When the deceleration of the vehicle M becomes insufficient with respect to the amount of operation of the brake pedal, there occurs a need for the driver to increase the amount of operation of the brake pedal.

On the other hand, as shown in C in FIG. 7, when the regenerative braking force Ereg is increased according to the decreased amount of the engine friction F, the total braking force becomes equivalent to the target value Etoltrg. In other words, the amount of decrease of the engine friction F will be offset by the amount of increase of the regenerative braking force Ereg. As a result, it is possible to avoid a situation where the deceleration of the vehicle M becomes too small with respect to the amount of operation of the brake pedal.

However, when the regenerative braking force Ereg is decided according to the method as mentioned above, the electric power generated by the alternator 101 may be unable to be fully charged into the high voltage battery 102 and the low voltage battery 103. In such a case, the ECU 20 may supply an excessive or surplus amount of generated electric power to the high voltage electric load 105.

Figure 8:
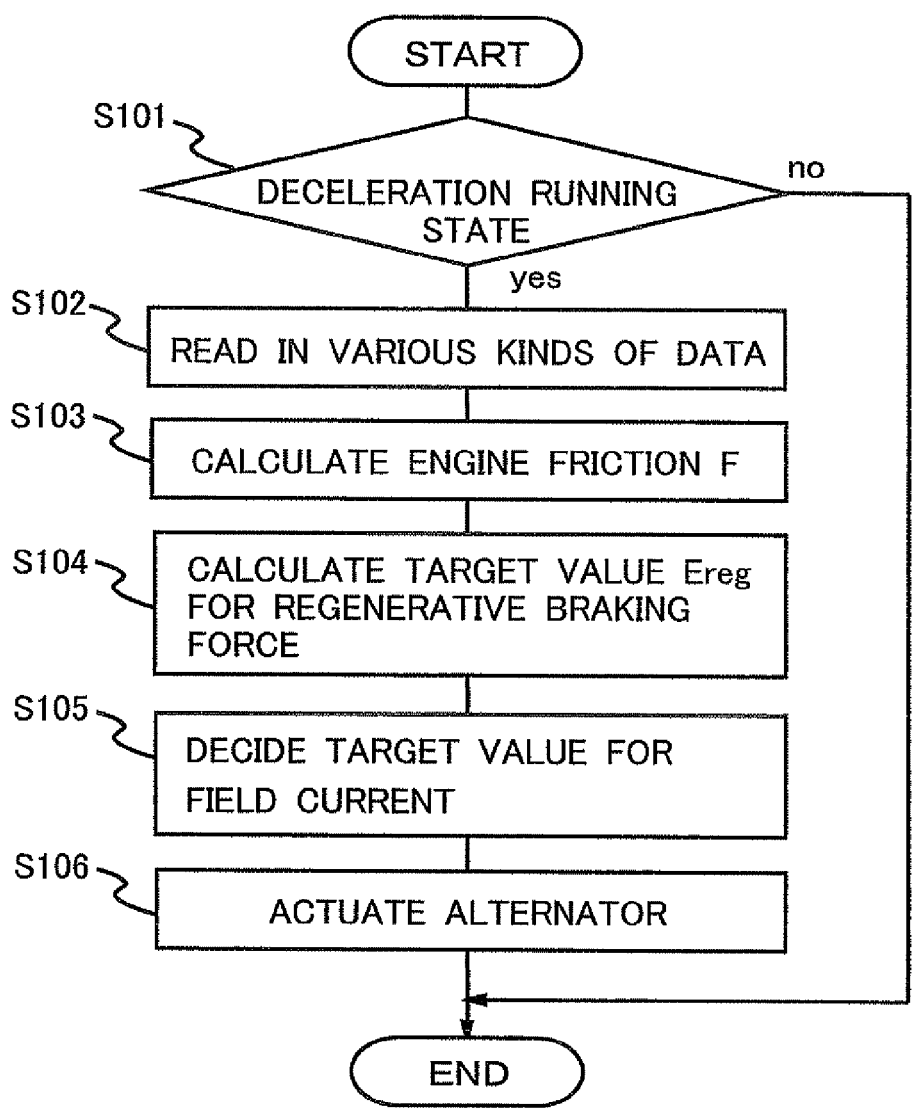
FIG. 8 is a flow chart showing a regenerative control routine.

Hereinafter, the execution procedure of the regenerative control in this embodiment will be described in line with FIG. 8. FIG. 8 is a flow chart showing a regenerative control routine. The regenerative control routine is a routine which has been beforehand stored in a ROM of the ECU 20, and is executed by the ECU 20 in a periodic manner.

In the regenerative control routine, first in step S101, the ECU 20 determines whether the vehicle M is in a deceleration running state. Specifically, when the output signal of the accelerator position sensor 21 (the degree of opening of the accelerator pedal) is zero, and when the output signal of the vehicle speed sensor 25 (or wheel speed sensors 60, 70) is larger than zero, and when the output signal of the brake stroke sensor 23 (the amount of operation of the brake pedal) is larger than zero, the ECU 20 makes a determination that the vehicle is in a deceleration running state.

In cases where a negative determination is made in the above-mentioned step S101, the ECU 20 ends the execution of this routine. On the other hand, in cases where an affirmative determination is made in the above-mentioned step S101, the ECU 20 proceeds to S102. In step S102, the ECU 20 reads in various kinds of data. Specifically, the ECU 20 reads in the output signal of the shift position sensor 22 (the shift position), the output signal of the brake stroke sensor 23 (the amount of operation of the brake pedal), the engine rotational speed Ne, the output signal V of the vehicle speed sensor 25 (the vehicle speed), the output signal Toil of the oil temperature sensor 26 (the oil temperature), and the output signal Poll of the oil pressure sensor 27 (the oil pressure).

In step S103, the ECU 20 calculates the engine friction F by using, as parameters, the oil temperature Toil, the oil pressure Poil, and the engine rotational speed Ne, which have been read in the above-mentioned step S102. At that time, the ECU 20 may calculate the engine friction F by making use of the above-mentioned maps of FIG. 3 through FIG. 5, or may calculate the engine friction F by making use of the above-mentioned arithmetic operation models.

In step S104, the ECU 20 calculates the target value Eregtrg of the regenerative braking force by using the above-mentioned various kinds of data read in step S102 and the above-mentioned engine friction F calculated in step S103. Specifically, the ECU 20 calculates the kinetic energy Evhl of the vehicle M, the running resistance Erl, the frictional braking force Ebrk, and the pumping loss Eegpl of the internal combustion engine 1 by using, as parameters, the above-mentioned various data read in step S101. Subsequently, the ECU 20 calculates the target value Eregtrg of the regenerative braking force (=Evhl−(Erl+Ebrk+Eegpl+F)) by subtracting, from the kinetic energy Evhl of the vehicle M, the running resistance Erl, the frictional braking force Ebrk, the pumping loss Eegpl of the internal combustion engine 1, and the engine friction F.

In step S105, the ECU 20 decides a target value of the field current by using, as parameters, the above-mentioned target value Eregtrg of the regenerative braking force calculated in step S104, the rotational speed of the alternator 101, and a voltage suitable for charging of the battery 102 or 103 which becomes a target to be charged. At that time, the ECU 20 calculates, from the output signals of the first SOC sensor 102a and the second SOC sensor 103a, an amount of electric power which can be received by each of the batteries 102, 103. Then, the ECU 20 selects, as a target battery to be charged, one of the batteries 102, 103 of which the amount of electric power capable of being received or charged is larger than that of the other.

In step S106, the ECU 20 actuates the alternator 101 in accordance with the above-mentioned target value of the field current decided in step S105. At that time, in cases where the battery 102 or 103 to be charged can not receive all the generated electric power of the alternator 101, the ECU 20 supplies an excessive or surplus amount of generated electric power to the high voltage electric load 105.

According to the above-mentioned embodiment, even in cases where the engine friction F changes at the time of deceleration running of the vehicle M, the magnitude of the total braking force can be adjusted to a desired magnitude. As a result, it is possible to avoid the situation where the deceleration of the vehicle M becomes too large with respect to the amount of operation of the brake pedal, and the situation where the deceleration of the vehicle M becomes too small with respect to the amount of operation of the brake pedal.

<Second Embodiment>

Next, reference will be made to a second embodiment according to the present invention based on FIG. 9. Here, a construction different from that of the above-mentioned first embodiment will be described, and an explanation of the same construction will be omitted.

The difference of this second embodiment from the above-mentioned first embodiment resides in the feature that the calculated value of the engine friction F is corrected based on a property change in the lubricating oil.

In cases where the lubricating oil has degraded with the lapse of time, or in cases where the kind of the lubricating oil is changed by the user of the vehicle M, etc., the engine friction calculated according to the method described in the first embodiment may differ from the actual engine friction.

Accordingly, in the regenerative control system of this embodiment, the ECU 20 obtains the actual engine friction (hereinafter referred to as an "actual engine friction Fr") from an amount of fuel injected at the time when the internal combustion engine 1 is in a no-load running state, and at the same time calculates the engine friction F according to the method described in the first embodiment.

The ECU 20 calculates a difference $\Delta F(=Fr-F)$ between the actual engine friction Fr and the engine friction F. However, the above-mentioned difference $\Delta F$ is a difference between the actual engine friction Fr and the engine friction F at the time when the internal combustion engine 1 is in the no-load running state. The engine rotational speed at the time when the internal combustion engine 1 is in the no-load running state and the engine rotational speed at the time when regenerative control is being carried out (the actual engine rotational speed) are different from each other. For that reason, even if the engine friction F calculated at the time of the execution of the regenerative control is corrected by the above-mentioned difference $\Delta F$, the engine friction F after correction may differ from the actual engine friction. Accordingly, the ECU 20 may multiply the above-mentioned difference $\Delta F$ by a engine rotational speed correction coefficient as described in the above-mentioned explanation of FIG. 5, and correct the engine friction F by the result of the calculation.

When the engine friction F is corrected in this manner, it becomes possible to enhance the accuracy of calculation of the engine friction F, even in cases where the lubricating oil has degraded with the lapse of time, or in cases where the kind of the lubricating oil has been changed.

In the following, reference will be made to a procedure to obtain a correction value for the engine friction F along the lines of FIG. 9. FIG. 9 is a flow chart showing a routine which is executed by the ECU 20 at the time when the correction value for the engine friction F is learned. This routine is a routine which has been beforehand stored in a ROM of the ECU 20, and is executed by the ECU 20 in a periodic manner.

Figure 9:
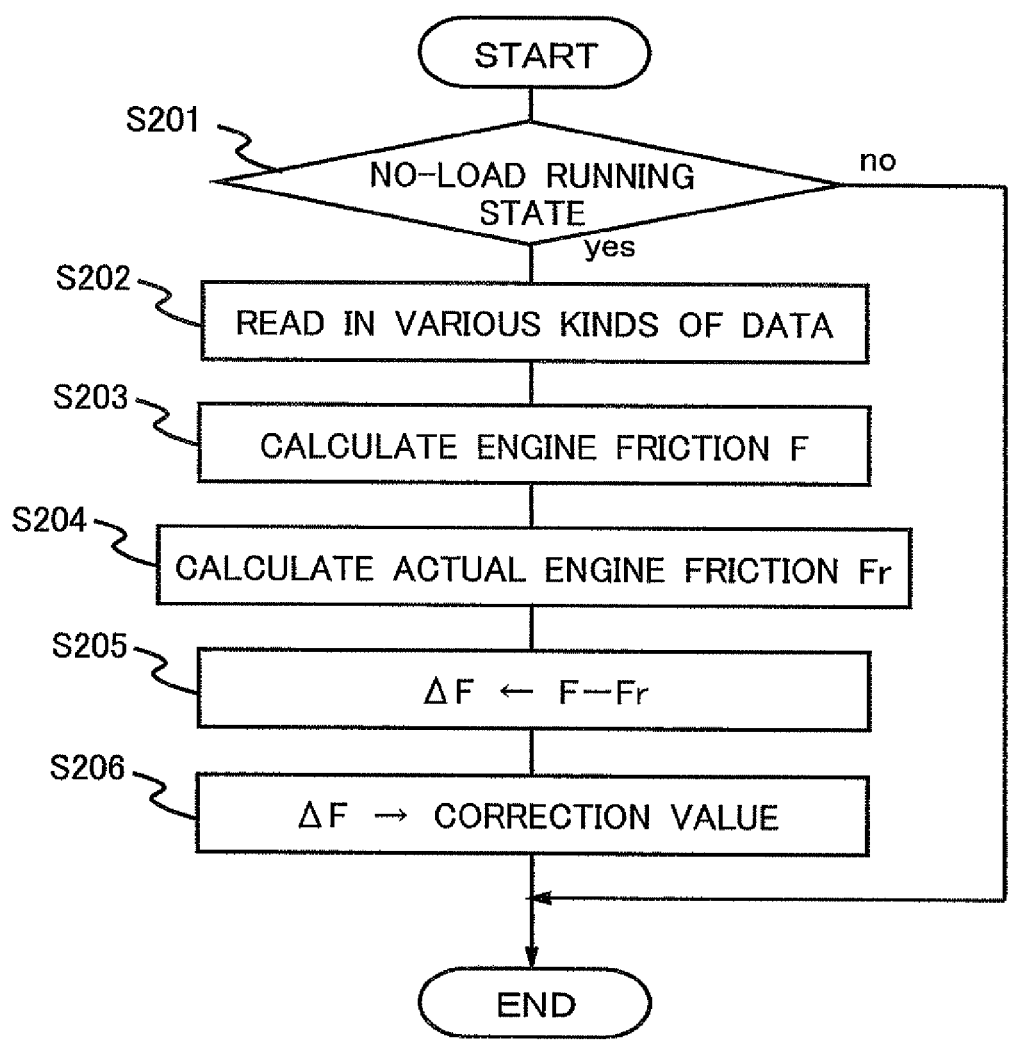
FIG. 9 is a flow chart showing a routine which is executed at the time when a correction value for the engine friction is learned.

In the routine of FIG. 9, first in S201, the ECU 20 determines whether the internal combustion engine 1 is in a no-load running state. Specifically, when auxiliary equipment such as a compressor for an air conditioner, etc., is in a non operating state, and when the oil temperature Toil is in a proper range (e.g., the temperature of the lubricating oil after the completion of warming up of the internal combustion engine 1), and when the internal combustion engine 1 is in an idle state, the ECU 20 makes a determination that the internal combustion engine 1 is in a no-load running state.

In cases where a negative determination is made in the above-mentioned step S201, the ECU 20 ends the execution of this routine. On the other hand, in cases where an affirmative determination is made in the above-mentioned step S201, the process of the ECU 20 goes to step S202.

In step S202, the ECU 20 reads in various kinds of data. Specifically, the ECU 20 reads in the amount of fuel injection, the engine rotational speed Ne, the output signal (the oil temperature) Toil of the oil temperature sensor 26, and the output signal (the oil pressure) Poil of the oil pressure sensor 27.

In step S203, the ECU 20 calculates the engine friction F by using, as parameters, the engine rotational speed Ne, the oil temperature Toil, and the oil pressure Poil, which have been read in the above-mentioned step S202. The calculation method at that time uses the same calculation method as in the above-mentioned first embodiment.

In step S204, the ECU 20 calculates the actual engine friction Fr by using, as a parameter, the amount of fuel injection, which has been read in the above-mentioned step S202. At that time, the correlation between the amount of fuel injection and the actual engine friction Fr may be made into a map in advance.

In step S205, the ECU 20 calculates the difference $\Delta F$ ($=Fr-F$) between the above-mentioned engine friction F obtained in step S203 and the above-mentioned actual engine friction Fr obtained in step S204. In step S206, the ECU 20 stores the above-mentioned difference ΔF as a correction value.

When the correction value ΔF is obtained in this manner, the ECU 20 corrects the calculated engine friction F by the use of the above-mentioned correction value ΔF, at the time when the engine friction F has been calculated in the regenerative control. Specifically, the ECU 20 obtains the engine rotational speed correction coefficient from the engine rotational speed Ne at the time when the engine friction F has been calculated and the above-mentioned map of FIG. 5. Subsequently, the ECU 20 multiplies the above-mentioned correction value ΔF by the engine rotational speed correction coefficient, and adds the multiplication value thus obtained to the engine friction F. When the engine rotational speed Ne is corrected according to such a method, it becomes possible to obtain the more accurate engine friction F, even in cases where the property of the lubricating oil has changed.

Here, note that the method of correcting the engine friction F is not limited to the above-mentioned method, but for example, Ov used for the above-mentioned arithmetic operation model may be corrected by the above-mentioned difference ΔF.

EXPLANATION OF REFERENCE NUMERALS AND CHARACTERS

1 internal combustion engine
2 transmission
3 propeller shaft
4 differential gear
5 drive shafts
6 drive wheels
7 undriven wheels
20 ECU
21 accelerator position sensor
22 shift position sensor
23 brake stroke sensor
24 crank position sensor
25 vehicle speed sensor
26 oil temperature sensor
27 oil pressure sensor
60 first wheel speed sensor
70 second wheel speed sensor
100 power generation mechanism
101 alternator
101*a* regulator
102 high voltage battery
102*a* first SOC sensor
103 low voltage battery
103*a* second SOC sensor
104 changeover switch
104*a* input terminal
104*b* first output terminal
104*c* second output terminal
105 high voltage electric load

The invention claimed is:

1. A regenerative control method for a vehicle in which at a time of deceleration running of the vehicle on which an internal combustion engine and an electric generator configured to be operatively connected with wheels are mounted, kinetic energy of the wheels of the vehicle is converted into electrical energy by applying an excitation current to the electric generator, the method being executed by an electronic control unit of the vehicle and comprising:

regulating an amount of the excitation current applied to the electric generator according to a magnitude of friction in the internal combustion engine, the magnitude of friction being obtained by an arithmetic operation model using as arguments a temperature of lubricating oil and an engine rotational speed; and correcting the arithmetic operation model by use of a difference between (i) the magnitude of friction in the internal combustion engine calculated according to the arithmetic operation model at a time when the internal combustion engine is in a no-load running state, and (ii) the magnitude of friction in the internal combustion engine calculated by using an amount of fuel injection as a parameter at the time when the internal combustion engine is in the no-load running state.

2. A regenerative control system for a vehicle comprising:

an internal combustion engine configured to be operatively connected with wheels of the vehicle;

an electric generator configured to be operatively connected with the wheels or the internal combustion engine; and an electronic control unit configured to control a regenerative process that converts kinetic energy of the wheels into electrical energy by supplying an excitation current to the electric generator at a time of deceleration running of the vehicle, wherein the electronic control unit obtains a magnitude of friction in the internal combustion engine according to an arithmetic operation model using as arguments a temperature of lubricating oil and a number of engine revolutions per unit time, and regulates an amount of the excitation current to be supplied to the electric generator according to the magnitude of friction thus obtained, and the electronic control unit corrects the arithmetic operation model by use of a difference between (i) the magnitude of friction in the internal combustion engine calculated according to the arithmetic operation model when the internal combustion engine is in a no-load running state, and (ii) the magnitude of friction in the internal combustion engine calculated by using an amount of fuel injection as a parameter at the time when the internal combustion engine is in the no-load running state.

* * * * *